(12) United States Patent
Quatse et al.

(10) Patent No.: US 8,412,566 B2
(45) Date of Patent: Apr. 2, 2013

(54) HIGH-PRECISION CUSTOMER-BASED TARGETING BY INDIVIDUAL USAGE STATISTICS

(75) Inventors: Jesse T. Quatse, Mill Valley, CA (US); Anssi Karhinen, Helsinki (FI); Eric G. Wasserman, Berkeley, CA (US)

(73) Assignee: YT Acquisition Corporation, Delray Beach, FL (US)

( * ) Notice: Subject to any disclaimer, the term of this patent is extended or adjusted under 35 U.S.C. 154(b) by 1391 days.

(21) Appl. No.: 10/616,486

(22) Filed: Jul. 8, 2003

(65) Prior Publication Data
US 2005/0010472 A1  Jan. 13, 2005

(51) Int. Cl.
G06Q 30/00 (2012.01)
(52) U.S. Cl. .................................................. 705/14.1
(58) Field of Classification Search .............. 705/14, 705/16, 14.1
See application file for complete search history.

(56) References Cited

U.S. PATENT DOCUMENTS

| | | | |
|---|---|---|---|
| 6,684,195 B1 * | 1/2004 | Deaton et al. | 705/14.13 |
| 7,058,591 B2 | 6/2006 | Giuliani et al. | |
| 2003/0208754 A1 * | 11/2003 | Sridhar et al. | 725/34 |
| 2003/0217332 A1 | 11/2003 | Smith et al. | |
| 2004/0267674 A1 | 12/2004 | Feng et al. | |
| 2005/0222996 A1 | 10/2005 | Yalamanchi | |
| 2006/0253468 A1 | 11/2006 | Ramsey et al. | |

FOREIGN PATENT DOCUMENTS
WO   WO 02/015454 A3   2/2002

* cited by examiner

Primary Examiner — Daniel Lastra
(74) Attorney, Agent, or Firm — Pepper Hamilton LLP

(57) ABSTRACT

A system for distributing limited numbers of promotional offers to individual customers, the promotional offers being targeted to customers based on the customers' individual probabilities of accepting the offers in such a way that each customer can receive a limited number of offers that are estimated to be most likely to be acceptable by the customer. Customer-Based targeting analyzes each customer's past purchasing behavior relative to a master list of promotional offers made available to all customers. From that master list Customer-Based targeting selects a preset limit of promotional offers for each individual customer according to the likelihood that, given the opportunity to select any offers of the master list, each customer would prefer those few offers selected specifically for the customer. Various techniques are disclosed for providing an offer acceptance probability profile tailored for individual customers for use in the Customer-Based targeting technique. Product groupings and market segments are taken into account. Empirical Bayes techniques are applied to the estimation of the offer acceptance profile, and techniques suitable for handling sparse data are applied. Various marketing strategies are incorporated into the system. A graphical technique is provided for adjusting the offer acceptance profile that enables a user to override a system computation and manually set the relative offer acceptance probabilities for an individual user or class of users.

21 Claims, 10 Drawing Sheets

|          | OFFER PROBABILTY/SCORE |||| 
|----------|---------|---------|---------|---------|
|          | offer-1 | offer-2 | offer-3 | offer-4 |
| customer-1 | 0.006 | 0.002 | 0.004 | 0.009 |
| customer-2 | 0.007 | 0.011 | 0.02  | 0.001 |
| customer-3 | 0.009 | 0.001 | 0.003 | 0.002 |
| customer-4 | 0.004 | 0.003 | 0.002 | 0.005 |

FIG. 3

By Promotion

Table 1: Column Based Targeting - Distribution by Offer

| offer-1 | offer-2 | offer-3 | offer-4 |
|---------|---------|---------|---------|
| customer-2 | customer-2 | customer-2 | customer-1 |
| customer-3 | customer-4 | customer-1 | customer-4 |

By Customer

Table 2: Column Based Targeting - Distribution by Customer

| customer-1 | customer-2 | customer-3 | customer-4 |
|------------|------------|------------|------------|
| offer-3 | offer-1 | offer-1 | offer-2 |
| offer-4 | offer-2 | | offer-4 |
|         | offer-3 |         |         |

Product-Based Targeting

Table 3: Row Based Targeting - Distribution by Customer

| customer-1 | customer-2 | customer-3 | customer-4 |
|------------|------------|------------|------------|
| offer-1 | offer-2 | offer-1 | offer-2 |
| offer-4 | offer-3 | offer-3 | offer-4 |

Customer-Based Targeting

FIG. 4

| Market Basket Transaction Database | | | | |
|---|---|---|---|---|
| Customer | SKU | Basket ID | Quantity | Total Price |
| 1001 | 32 | 2001 | 1 | $2.49 |
| 1001 | 37 | 2001 | 3 | $3.57 |
| 1001 | 36 | 2002 | 4 | $5.00 |
| 1001 | 42 | 2002 | 1 | $16.50 |
| 1001 | 32 | 2002 | 4 | $5.60 |
| 1001 | 33 | 2002 | 4 | $4.98 |
| 1001 | 33 | 2003 | 1 | $2.49 |
| 1001 | 20 | 2003 | 2 | $2.88 |
| 1001 | 36 | 2003 | 1 | $1.25 |
| 1001 | 36 | 2004 | 1 | $1.25 |
| 1001 | 35 | 2004 | 1 | $2.88 |

*FIG. 5*

| | | Transaction Summary Table | | | | | | |
|---|---|---|---|---|---|---|---|---|
| Customer | Baskets | ••• | 32,37 | 33,36,42 | 34 | 35,36 | 37,42 | ••• |
| 1001 | 4 | ••• | 2 | 3 | 0 | 3 | 2 | ••• |

*FIG. 6A*

| | SKU Grouping Probability Profile, Customer X | | | | | | |
|---|---|---|---|---|---|---|---|
| SKU Grouping | ••• | 32,37 | 33,36,42 | 34 | 35,36 | 37,32 | ••• |
| Probability | ••• | 0.5 | 0.75 | 0 | 0.75 | 0.5 | ••• |

*FIG. 6B*

| Category Name | Avg. $/mo |
|---|---|
| Platinum | $120 |
| Gold | $60 |
| Silver | $30 |
| Nugget | New |

HIGH-PRECISION CUSTOMER-BASED TARGETING BY INDIVIDUAL USAGE STATISTICS

BACKGROUND OF THE INVENTION

The present invention relates to the targeting of sales announcements, promotions, advertisements, coupons and the like to customers, and delivery of such targeted announcements, etc. to the customers in print or in electronic form, for example by cell phones, email, ATM device, or by any other device capable of printing, displaying or otherwise presenting a commercial message.

Retailers, wholesalers, marketers, and manufacturers often distribute promotional offers, such as coupons, offering discounts and other incentives in order to reward valuable customers, attract new customers, or promote the sale of specific products or services identified in the promotional offers. (Both products and services may be the subject of promotional offers. For ease of discussion both are referred to herein simply as "products.") Conventional promotional methods have a number of disadvantages. The creation, distribution, and handling of promotional offers is generally at a considerable cost and can require considerable infrastructure, particularly where the offer is communicated through printed material such as fliers, inserts or paper coupons. A typical newspaper insert or bulk mailing by a mass merchandiser for example may involve hundreds of thousands of pieces of paper that are distributed throughout a geographical area and that may require purchasers to tear off and hand in a coupon that must then be processed by the merchant. In addition, perhaps a more significant and far-reaching economic cost may arise from deterioration in customer relations as customers react more and more strenuously against the plethora of promotional offers bombarding them from email, direct mail, newspapers, and the Internet, to mention only a few of many possible channels.

Whatever the underlying motivation for any given promotional offer, the objective is the same—to induce the recipient to purchase the offered product. Each offer includes a discount or other incentive to encourage the recipient to accept the offer and purchase the subject product. The offer promoter realizes none of its anticipated benefits unless the offer is accepted, that is to say, unless the recipient purchases the promoted product. Motivated in part by the considerable cost and potential annoyance factor of large-scale conventional promotional campaigns, a need has been recognized for increasing the percentage of customers accepting each offer while decreasing the number of ineffective offers distributed to customers. This need has been partially addressed by selectively targeting customers for attention according to their history of past purchases or other relevant data. However, with the ever-increasing annoyance to the customer posed by increased numbers of unwanted offers, more precise and effective targeting is still needed. With the increased tendency of customers to ignore promotional offers altogether, or even to terminate relationships with promoters who persist in that annoyance, past targeting methods are no longer adequate and can even be detrimental. For example, many retail and online merchants have customer loyalty programs offering special promotions to repeat customers who have a loyalty card or have otherwise registered with the merchant. The basic motivation for the loyalty program is generally to further relations with the best customers by rewarding them with special promotional offers. But over-promotion can have the opposite effect of angering loyal customers who are annoyed at a barrage of unwanted promotions.

Another problem of conventional promotional methods is that they do not lend themselves to use on popular electronic terminals that are becoming a common form of customer interaction. New electronic terminal devices can have such limited capabilities that the distribution of general promotional offers is not practicable, and even limited distributions circumscribed by known targeting methods can be impractical or ineffective with many forms of electronic communication. For example, bank customers are sometimes confronted by promotional offers or advertisements when using the bank's ATM machines. Very few promotional offers can be presented in the brief few seconds that a customer typically spends at the ATM machine. Customers often avoid or even resent reading those very few offers if the offers do not consistently prove to be of personal interest to them as individuals. Cell phones impose even more severe constraints than ATM machines. Many customers consider their cell phones to be personal and consider commercial messages on their cell phones to be rude intrusions on their privacy. In addition, cell phones have a very limited screen for viewing promotional offers and call for an inconvenient sequence of keystrokes to manipulate promotions on the screen. Thus, for both the physical and relational reasons cell phones provide very little opportunity for successful promotional presentation with known technology.

In the past merchandisers have attempted to address the problem of individualized promotions by a process of targeting, generally meaning a technologically implemented method of matching promotional offers to one or more individual characteristics of customers. Targeting is currently carried out in a variety of ways for varying objectives and with varying success. Statistical methods can be applied to help identify the purchasing histories of those customers who would be most likely to purchase the product offered by any given promotion. Each customer's past purchasing history might be used to indicate the likelihood of purchasing any promoted product in the future. For example, a diaper promotion might be distributed to customers whose purchasing history reveals past purchases of baby bottles and baby food because those purchases imply a baby in the family and therefore a likelihood that baby diapers might be purchased in the future. This form of targeting is intended to identify those who are most likely to buy. In the reverse sense, targeting can exclude those who are least likely to buy. For example, a targeting process should not distribute a promotion for meat to vegetarians. The overall objective of targeting was, and still is, to significantly reduce the number of promotional offers distributed while significantly increasing the number accepted.

These forms of targeting might appear to be adequate but they are not. Several disadvantages arise. One is the disadvantage of inundating some customers with many promotional offers while depriving others of any. Wide disparities were to be expected because any random collection of offers is statistically likely to be favored much more by some customers than others and to be disfavored much more by some than others. In the past, statistical targeting has been product-based in the sense that each product being promoted was distributed to those customers with the greatest likelihood of accepting the promotional offer. To make product-based targeting work, some cutoff threshold of probability has to be specified to differentiate customers having a high probability of acceptance from those having a low probability of acceptance. The result is that some customers are likely to receive a disproportionately large number of offers while others receive very few or none. As a result of the disparity, many distributed offers or coupons are wasted, and some customers will be annoyed by a deluge of offers while others will be annoyed by the lack of attention. Targeted in that way, some customers could be expected to purchase only a small percentage of products offered because they receive many more offers than they could or would accept in a reasonable time period. Conversely, customers who receive very few offers will have very few to accept. Thus the various goals and purposes of targeting are contravened, and targeting does not effectively achieve the purposes for which it was intended.

A further disadvantage of the past targeting attempts is the inability to effectively control the number of promotional offers delivered to each individual customer while still retaining precision in targeting. Although past methods may be able to establish and enforce several different distribution limits, the manner in which those limits are maintained can also impose extremely severe disadvantages. For example, in the prior art of coupon distribution, there are sometimes limits on the number of coupons distributed in total, the number for each offer-communicating terminal, the number for each store, the number for each offer, and also the maximum number to be delivered to any one customer. The impositions of any or all such limits must result in the reduction of the number of coupons distributed to some customers. The selection of which coupons to withhold is typically based upon factors other than the purchase history of the customer, for example the age of the coupon or simply an arbitrary first-come-first-serve policy as the coupons are created. Thus some coupons that might have been distributed to a given customer because of that customer's purchasing statistics may be withheld because of some unrelated limit. The disadvantage arises in the fact that those coupons withheld from a customer because of limits might well have been the very coupons most likely to be redeemed by that customer. Therefore, the setting of limits in the past had the major disadvantage of distorting the targeting process. Some offers that were less likely to be redeemed by the customer might have been distributed while some that were more likely to be redeemed might not have.

A further disadvantage of the past targeting attempts is the statistical bias towards products that are more broadly used, rather than those more likely to be redeemed by each individual customer. The bias arises where the probability of purchasing a product in the future is estimated simply by the frequency of similar purchases in the past. For example, an offer of a 10% discount on bread might be distributed to almost all customers because almost all buy bread frequently. The statistical analysis is not normalized in the sense that it does not take into consideration the relative purchasing behavior between customers so that offers for bread might be distributed only to those who purchase bread much more often than others. Without normalization, customer purchasing statistics can misrepresent the intentions of the customer when confronted by a set of competing offers.

Similarly, the discount offered will generally affect the probability of acceptance. Therefore, statistical methods that do not consider the discount of the offer are not as precise as those that do. It is well accepted based on principles of supply and demand that the probability of a purchase increases with the size of the discount. That is to say, the sale of a $20 item is more probable when discounted to $10 than when discounted only to $15. For accurate targeting the merchandiser needs some way to appropriately increase the estimated probability of acceptance of an offer according to an increase in incentive value, whether the offer be a discount or a giveaway after a prescribed number of units have been purchased.

Another disadvantage of past targeting attempts has been the lack of precision with sparse data. In cases where a great number of differing product items can be promoted, each individual customer is not likely to have purchased many of each item. Therefore, purchasing behavior data can lead to large variance in estimated means with the resulting imprecision in targeting.

Another disadvantage of past targeting attempts has been the inability of the merchandiser to vary the distribution according to a preprogrammed merchandising strategy. For example, one promotion might be offered to customers to entice them to switch from one brand to another, say from brand A to brand B. The targeted group consists of those customers of brand A. Some other promotion might be offered to entice them to purchase a more expensive and higher quality item than a similar item that they buy regularly. In that case, the targeted group consists of those customers who buy a less expensive equivalent to brand B. These two examples, among the multiplicity of different strategies, illustrate the need to adjust the class of targeted customers consistent with the goal of the selected strategy.

The growing customer resentment towards unwanted advertisements and unsolicited promotional offers is severely affecting the conduct of business. In email, unsolicited messages referred to as "spam" have given rise to many spam defeating products from major enterprises, such as "Spaminator" by Earthlink and "MSN-8 Junk Email Filter" by Microsoft Corporation. At least one major Internet service provider has initiated legal actions against five spam mailers as a result of complaints from 8 million customers. Telemarketing has become annoying enough to the general public that new laws have been enacted heavily penalizing a telemarketer who calls a telephone that is registered on a "Do Not Call" list. Unfortunately for the retailer, wholesaler, manufacturer, and customer, these attempts at curbing the intrusion of unwanted promotional offers tend to discourage promotional offers altogether without consideration of the individual differences between customers. In short, past marketing strategies have been so annoying and intrusive that they have engendered new products and new laws to block the marketing strategies altogether.

SUMMARY OF THE INVENTION

The present invention provides a method and apparatus for targeting customers that overcomes the above disadvantages of past targeting approaches. It is particularly beneficial in cases where the number of offers to be distributed must be limited and the appeal of the offer to the individual customer is important. The two requirements of limited distribution and individualized appeal are handled in such a way as to optimize the likelihood of customer acceptance. The invention is equally applicable to promotional offers for customers of traditional brick and mortar retail establishments as well as promotions over the Internet or in other channels of trade.

It is an object of the invention to provide a targeting method that matches promotional offers to individual customers in such a way that each customer can receive a limited number of offers that are estimated to be most likely to be acceptable by the customer, even when that limited number is much smaller than the total number of offers available for distribution, and where several differing limitations might apply concurrently. The invention provides probability estimates based upon such factors as each individual customer's purchasing history as well as other personal data and information relating to the general context of the offer such as events, timing, and location. In prior art targeting methods the individual purchasing history of each customer is used to match each offer to those customers estimated to be the most likely to accept the offer. A probability threshold can be set so that each promotion can be offered to a reduced number of customers rather than to all. This form of prior art targeting strategy is referred to here as "Product-Based" targeting because it selects the customers for each product. In contrast, the present invention provides a targeting strategy referred to here as "Customer-Based" in that it selects the products for each customer. As will be apparent from the explanations hereinbelow Customer-Based targeting along with other methods of the invention overcomes or greatly diminishes the disadvantages of prior art targeting techniques noted above. In particular, the Customer-Based targeting distributes only the promotional offers most likely to be personally appealing to each individual customer, and in so doing reduces the annoyance to the customers, increases the rate at which customers accept promoted offers, and reduces the cost of the promotions. It provides a new technological and marketing practice that enables a very few promotional offers to be individually targeted with a high likelihood of being personally appealing to each individual receiving the offer.

The Customer-Based targeting technology of the invention accommodates each customer's individual tastes and purchasing proclivities. Customer-Based targeting analyzes each customer's past purchasing behavior relative to a master list of promotional offers made available to all customers. From that master list Customer-Based targeting selects a preset limit of promotional offers for each individual customer according to the likelihood that, given the opportunity to select any offers of the master list, each customer would prefer those few offers selected specifically for him or her. This unique approach to targeting avoids the major disadvantages of conventional Product-Based targeting methods caused by the wide disparity in individual customer tastes. In this manner the number of acceptances per offer may be found to increase dramatically while the number distributed falls significantly. A more sophisticated, statistically based Limit Manager process is provided to assure that the customers receive the offers that they are most likely to redeem, even if limits are applied that reduce the number of promotional offers and therefore that withhold some promotional offers from some customers.

It is also an objective of the invention to calculate the necessary statistical estimates with very high precision through several methods including but not limited to the use of Bayes techniques for reducing variance. Empirical Bayes techniques are applied to improve the imprecision that results from sparse data. In general, the preprogrammed merchandising strategies of the invention serve to declare more precisely which customers are to be targeted and therefore to declare discounts more accurately. The result is to improve targeting precision while simplifying the declaration of targeting information.

It is a further objective of the invention to distribute promotional offers by hardcopy printing as well as all types of electronic means such as Internet, email, and telephone. It is a further objective of the invention to reduce the negative effects of distributing offers on paper by providing a practical and efficient method for multi-channel distribution electronically on cell phones and other mobile devices that can be carried instead of paper. It is also an objective of the invention to target customers according to Marketing Strategies according to the method of declared distribution rules embodied in the invention. This individualizing nature of the invention through Customer-Based targeting and personal data, the management of limits, the Strategies, and other features of the invention eliminate the greatest disadvantages of current targeting systems.

In one of its aspects the invention comprises a method and apparatus for distributing Limited Lists and Tree-Structured Lists of promotional offers to targeted customers with each List being individualized to the each target customer. All offers on all of the Limited Lists or Structured Lists can be taken from the same Master List of offers. Each customer's Limited List or Structured List is generated according to some combination of the given customer's personal shopping history, personal attributes, and other pertinent context such as location, time, and personal data. A simplified example of the process is schematized in FIG. 1, which is offered here only to assist in illustrating the invention and is not to be taken as limiting the invention only to the methods and steps illustrated in the Figure. A data structure 10 is provided in which the customers are each modeled in terms of usage and personal data. The targeting process 11 uses statistical methods and rule-based inferences to score each promotional offer of the Master List of offers 12 according to the model of each customer X, thereby generating an Ordered List of offers 13 which are ordered by score specifically for the given customer X. Of that list, only the limited number of offers having the highest estimated probability for customer X, and complying with other constraints, are allocated to the Offer Distribution List 14 for distribution to customer X. Such other constraints may include any number of limits on the number of offers to be distributed in total, as groups, individually, by location, or by any other condition. It is an aspect of the invention that the length of the Distribution Lists 14 can be much shorter than those of the Master List 12 or Ordered List 13 while continuing to be the estimated most probable products to be purchased by the given customer relative to all others on the Master List while complying with any imposed distribution constraints. The application of certain constraints can introduce complexities that are not represented by FIG. 1.

The invention further passes the Offer Distribution List to each customer through adaptors to any or all of several communication channels such as email, mobile phone messaging, mobile phone java based http communications, PDA, printers, kiosks, and other client terminals.

The invention further assists the enterprise in forming the promotional offers by simplifying the task of targeting through preprogrammed marketing strategies. A simplified user interface of the invention supports the declaration of and further customization of the preprogrammed strategies of this invention, the editing of the Master List of Offers, the targeting needed to form the Offer Distribution List, and management of other details germane to the invention.

The apparatus of this invention comprises a computer system consisting of any number of servers, an interface to the user's database and point of sale systems, and adaptors for various distribution channels to which any number of promotional offer terminals can be electronically attached.

Other aspects, advantages, and novel features of the invention are described below or will be readily apparent to those skilled in the art from the following specifications and drawings of illustrative embodiments.

BRIEF DESCRIPTION OF THE DRAWINGS

FIG. 3 is a probability matrix showing the probability that the customer in the row will accept the offer in the column.

FIG. 4 is a diagram of three tables which demonstrate the difference between "Customer-Based" targeting and traditional "Product-Based" targeting.

FIG. 5 shows a simplified example of the Market Basket Transaction Database for a loyalty program of a hypothetical supermarket chain.

FIGS. 6A and 6B show two tables derived from the Market Basket Transaction Database of FIG. 5.

DETAILED DESCRIPTION OF ILLUSTRATIVE EMBODIMENTS

For purposes of illustration an embodiment of the invention is described in terms of several distribution channels such as email, cellular telephones, PDAs, Internet, direct mail, voice phone, and others. The embodiment connects to customer databases, point of sale systems, lists of promotions, business rules, and other repositories of information. Other embodiments of this invention may have different configurations depending upon the differences between installations and usage. This embodiment is offered only by way of example and no limitation to only those repositories, those connections, or those channels is thus intended. Promotional offers are presented to customers by distributing offers through the channels in formats particular to the channel. For clarity, a large supermarket chain is sometimes used herein to illustrate various aspects of the invention. The invention is applicable to any repeatable sales enterprise, (including retail, wholesale, and manufacturing) and no limitation only to supermarkets is thus intended.

As used herein the term "user" is intended to mean the person or people who operate an embodiment of this invention. The term "customer" is intended to mean the customer or prospective customer receiving promotional offers, typically those of the user. "Customer" may include both past customers and prospective future customers. The term "SKU" is commonly used in retail to abbreviate the phrase "Stock Keeping Unit," in other words an identifier for a product that can be sold by the unit to the customer. SKU serves as an operational definition but is not required because some retailers, wholesalers, and manufacturers may use some other term for the basic units of products that they offer for sale. Although SKU is the term used here for a product identifier, other forms of product identifiers may of course also be used. The term "Point of Sale" or "POS" refers to the electronic system which communicates data to and from the electronic cash register, checkout stand, customer id scanner, market basket contents scanner, or other terminal where the customer pays for or otherwise registers purchases. In the case of internet sales the POS is the electronic system that that communicates data to the purchaser's computer, internet-enabled cell phone, PDA or other device by which the purchaser is able to indicate an order and/or initiate payment.

Figure 2:
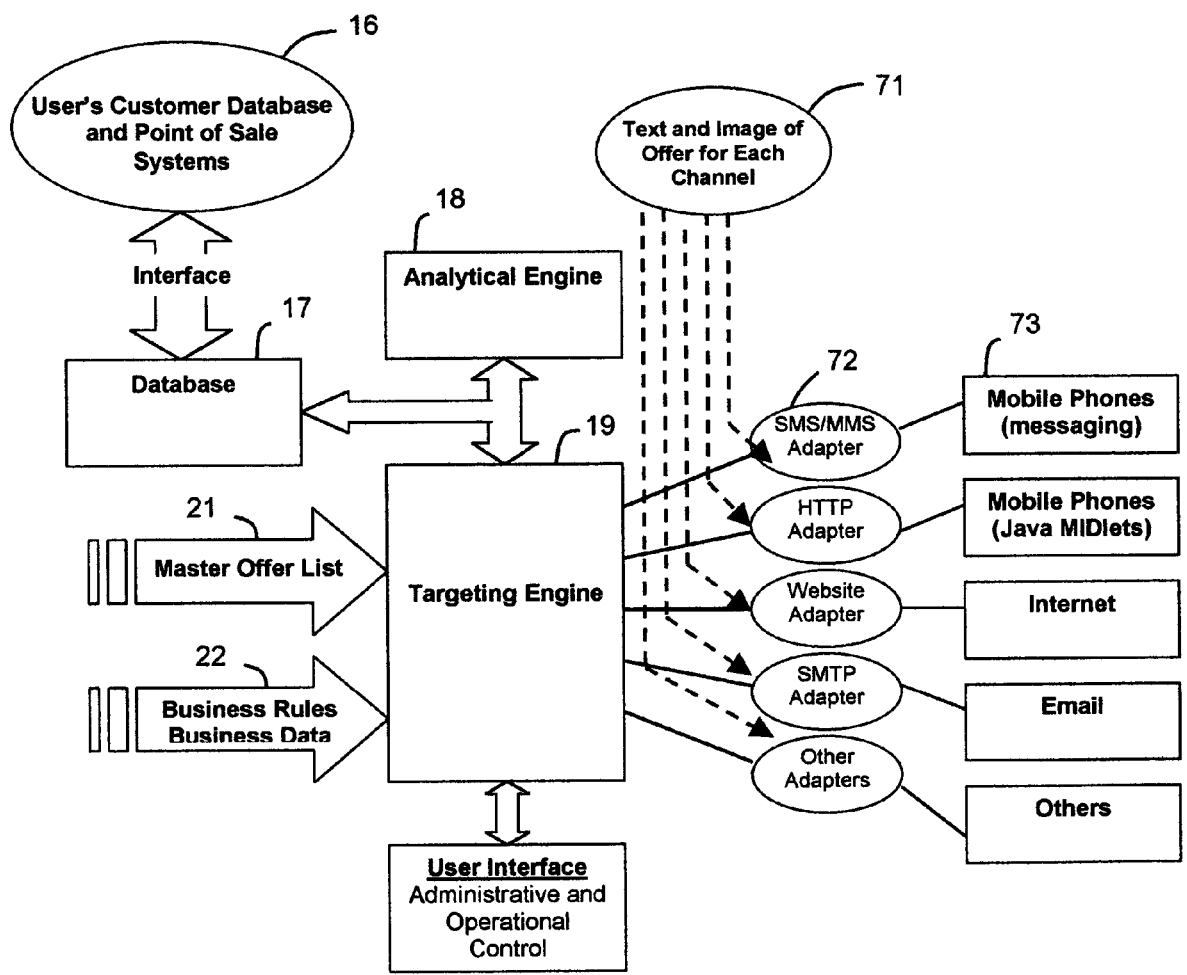
FIG. 2 is a block diagram of an apparatus embodying the invention.

FIG. 2 is a diagrammatic overview of an embodiment of an illustrative system according to the invention. Information from the Customer Database included in the POS system 16 comprises the individual profile information on each customer, for example, name, address, gender, customer segment, loyalty program data and other pertinent information. Such information can be used by this embodiment to limit offers to specific segments of users or to better target the group of customers to receive each offer. To list only a few examples, the information can be used to identify segments such as women under 18 years old, men and women of age over 18 years, or those whose spending record is in the upper 20% of all customers, next 20%, and so on. Other information in the Customer Database includes the data for all SKUs such as product name, brand, price per unit, and position within the taxonomy such as department or aisle, category, and subcategory. In some instances, the purchase records of all customers for all SKUs are available from which this embodiment can construct a customer purchase history table. The POS systems report each transaction, consisting of the SKU sold, quantity sold, price, customer, market basket id, and other data. The POS systems are also used to verify offer validity for the customer, date, and SKU. From the POS data, this embodiment can construct the customer purchase history table without data from the Customer Database. Software components of this embodiment organize, structure, and store the information in the database 17. The optional Analytical Engine 18 of this embodiment uses information from database 17 to form reports and data warehouse views that can be helpful to the user. It is not required in all embodiments.

The Targeting Engine 19 performs the essential software tasks. The apparatus can be configured in other ways to perform the same tasks, for example, different numbers of servers or different deployments of software modules may be used, and all such configurations are considered equivalent. The Targeting Engine 19 performs all of the methods illustrated in FIG. 2. Its functions utilize data from the database 17 as well as data directly received from external sources. The promotion list 21 corresponds to the master list of offers 10 of FIG. 2.

FIG. 3 shows a simple example of an offer probability matrix, sometimes referred to as a score matrix, used to target promotional offers according to customer purchasing history. For purposes of illustration the numerical entries in the matrix of FIG. 3 may have been determined by the methods of the invention or by prior art methods. The rows of the matrix correspond to customers and the columns to promotional offers. Each cell (i,j) represents the estimated probability that customer i will purchase offer j. In a common case the offer j consists of an incentive such as a discount for the purchase of a specific SKU. The probability of the offer being accepted is equated to the probability of the specific SKU being purchased at that discount value. Other contextual parameters may be involved in estimating cell values. For that reason the cell values are sometimes referred to by the more generalized term of "score" rather than simply "probabilities." Whatever term is used, and whatever calculation is involved, the value of each entry may be viewed as a measure of the estimated probability that the customer will purchase the SKU referenced by the offer.

FIG. 4 illustrates the results of conventional Product-Based targeting compared with the Customer-Based targeting of the invention. FIG. 4 includes three Tables that display the results of three different promotion distribution strategies. As in FIG. 3, the value in cell (i,j) is the estimated probability that the product(s) promoted by offer j will appear in the next market basket of customer i. Conventional targeting corresponds to searching the matrix of FIG. 3 vertically to find the customers who are most likely to accept the product offering of the column by purchasing the promoted product. Here the users are looking for the best customers for the product as contrasted with the best product for the customer as with the Customer-Based targeting of the invention. The column orientation is the reason for referring to conventional targeting as Product-Based. For simplicity the following limits are set in this example: (a) no more than two of each offer can be distributed, and (b) no customer can receive more than two offers. In general, targeting methods can be required to observe limits in the numbers of offers distributed in total, by store, by terminal, by individual offer, by number sent to each customer, and by others. The differences between conventional targeting and the Customer-Based targeting of the invention are most evident when those limits are applied.

According to the conventional "Promotion Distribution" of Table 1 seen in FIG. 4, offer-1 should be delivered to customer-2 and customer-3 because, of all customers in the offer-1 column, these customers have the highest probabilities of accepting Offer-1 (namely, 0.007 and 0.009). Table 1 is seen to comply with the limit (a) of only two of each offer because no offer is distributed to more than two customers. The vertically targeted best probabilities are shown in bold type in FIG. 3. The entries in Table 1 are reorganized by customers in Table 2 so as to show the Distribution to Customers resulting from Table 1. The reorganized Table 2 illustrates the point that customer-1 receives offer-3 and offer-4, customer-2 receives offer-1 and offer-2, etc. The information in Table 2 is identical to that of Table 1, entry by entry, but organized according to customers rather than products. According to the imposed limit (b), no customer can receive more than two promotional offers. Therefore, in Table 2, offer-3 cannot be delivered to customer-2 and it is struck off the list, even though offer-3 is by far the most likely promotional offer for customer-2 to accept among the offers available. Thus conventional targeting may fail to accommodate the proclivities of the customer.

By contrast, the Customer-Based targeting of Table 3 in FIG. 4 is obtained by selecting from the same probability matrix of FIG. 3 the two promotional offers of highest probability for each customer. Thus customer-1 receives offer-1 and offer-4 because these offers have the highest probability in the customer-1 row. A comparison of the Customer-Based targeting and traditional targeting may be seen by comparing the Product-Based targeting of Table 2 with the Customer-Based targeting of Table 3. In the conventional targeting of Table 2 the promotional offers are fewer by one because customer-2 was targeted for 3 promotional offers when only 2 are permitted by limit (a). Furthermore, the withheld offer-3 happened to be the most desirable to customer 2. In fact it was the most probable of any offer of this example to be accepted by any customer. Yet it was distributed to no customer by conventional targeting. The method of Product-Based targeting has no way of discovering the relative proclivities of the customer. That particular disadvantage of conventional targeting can result in withholding the promotional offers most likely to appeal to the customers and distributing the less appealing ones. The method of the invention eliminates this disadvantage. Furthermore, only one offer is distributed to customer-3 using the conventional method although limit (b) permits two offers per customer. That particular disadvantage of conventional targeting results in the delivery of fewer promotional offers in total, as compared to Customer-Based targeting.

FIG. 5 shows an example of the Market Basket Transaction Database for a frequent buyer or loyalty program of a hypothetical supermarket chain. Similar databases are commonly found at many other kinds of retail chains or outlets, wholesale distributors, manufacturers, or marketers and the invention may also find application to such other databases. For ease of illustration the database is presented in FIG. 5 as a simple table although in general the data may be organized in other data structures, for example, more complex database structures organized according to general principles of relational database organization well known in the art and requiring no elucidation here. The transactions in FIG. 5 are grouped by market basket, the market baskets being identified by IDs 2001, 2002, 2003, and 2004, and reference the contents of each market basket checked out by each customer at a store of the chain. Recall that SKU is a commonly used expression for any product that can be sold in units by the store and serves here is an illustrative product identifier. In general, each row references a SKU that appeared in a market basket of a referenced customer. In this example all purchases are made by customer number 1001. An important parameter for calculations is the number of market baskets in which each SKU type appeared, regardless of the quantity. For example, SKU 36 appears only three times in the database, in the rows labeled by reference numerals 26, 27 and 28, even though the quantity purchased was four in row 26 alone. In loyalty program systems the transaction database of FIG. 5 is commonly populated by checkout data electronically gathered from the POS terminal as the customer pays for purchases. The customer ID is typically associated with the market basket transaction by scanning the loyalty card or by keying in the phone number of the customer.

FIGS. 6A and 6B show two tables derived from the Market Basket Transaction Database of FIG. 5. These tables introduce the notion of SKU Grouping. The objective is to calculate the entries of a SKU Group Probability Profile for each customer such as shown in FIG. 6B for Customer X. Each entry in the probability row of FIG. 6B represents the probability that at least one SKU in the given group appear in a market basket of the given customer. First, the entries are calculated for the Transaction Summary Table of FIG. 6A, which summarizes all market basket transactions for each customer in terms of SKU Groupings. Representative SKU Groupings are shown, and the same SKU Groupings are referenced in FIGS. 6A and 6B. The row for customer 1001 is indicated by reference numeral 29 in this example summary table. The Transaction Summary Table is then used to estimate the probability that at least one of the SKUs in the SKU Grouping will appear in a market basket of the given customer.

In this example of four market baskets the SKU Grouping (33,36,42) is represented three times, that is, in three different market baskets of the Transaction Database for Customer 1001. None of the SKUs of the Grouping appears in basket number 2001. All three appear in 2002. SKU 33 and SKU 36 both appear in 2003 and SKU 36 appears in 2004. Altogether at least one of the SKUs in the SKU Grouping appears in three of the four baskets. Thus the probability of the Grouping can be estimated as (3 occurrences)/(4 baskets)=¾. Other more complex estimations can be used, for example, using Empirical Bayes formulations as discussed below in connection with the flowchart of FIG. 8.

Figure 7:
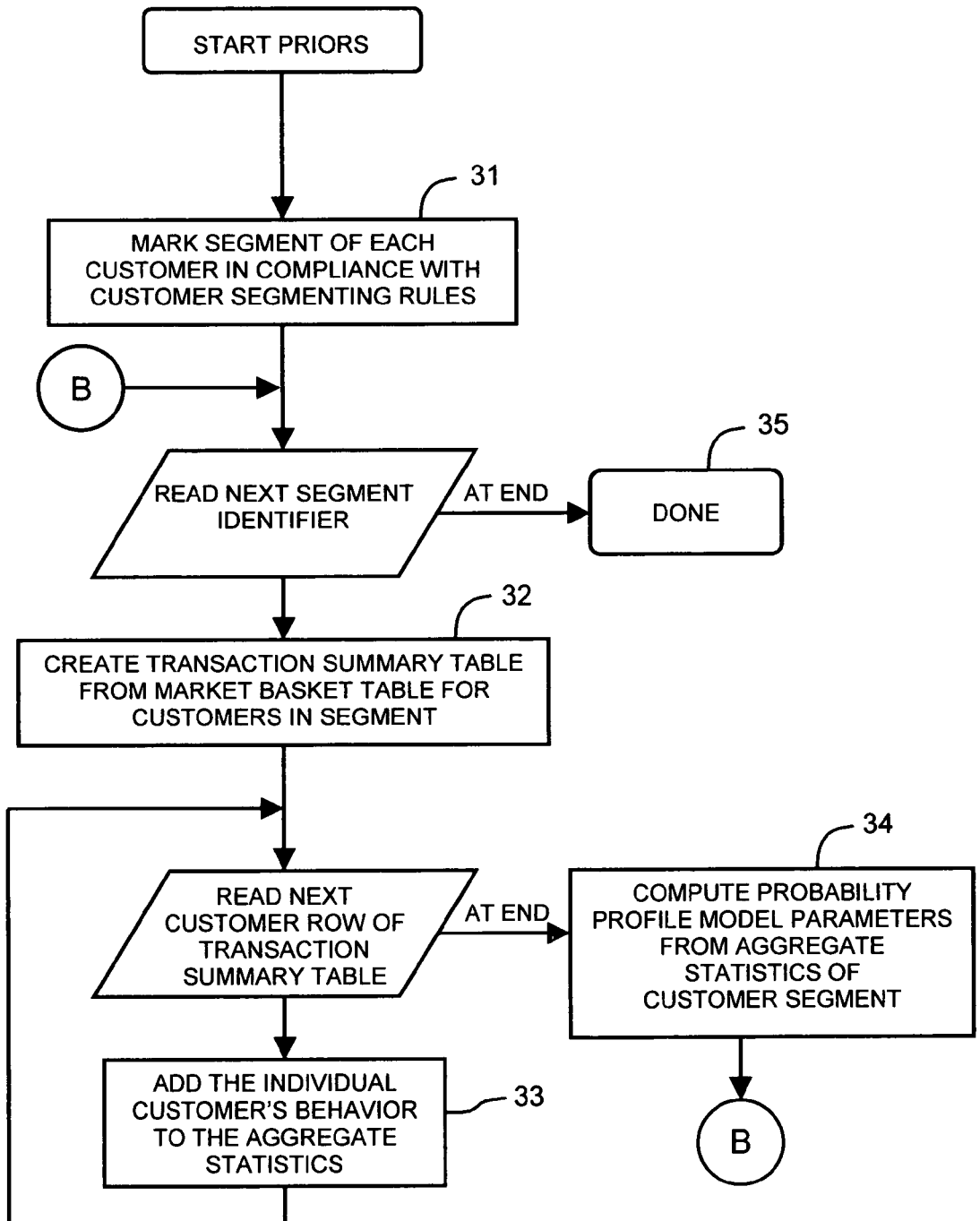
FIG. 7 is an illustrative flowchart for calculating the average SKU probabilities given any form of customer marketing segmenting.
Figure 8:
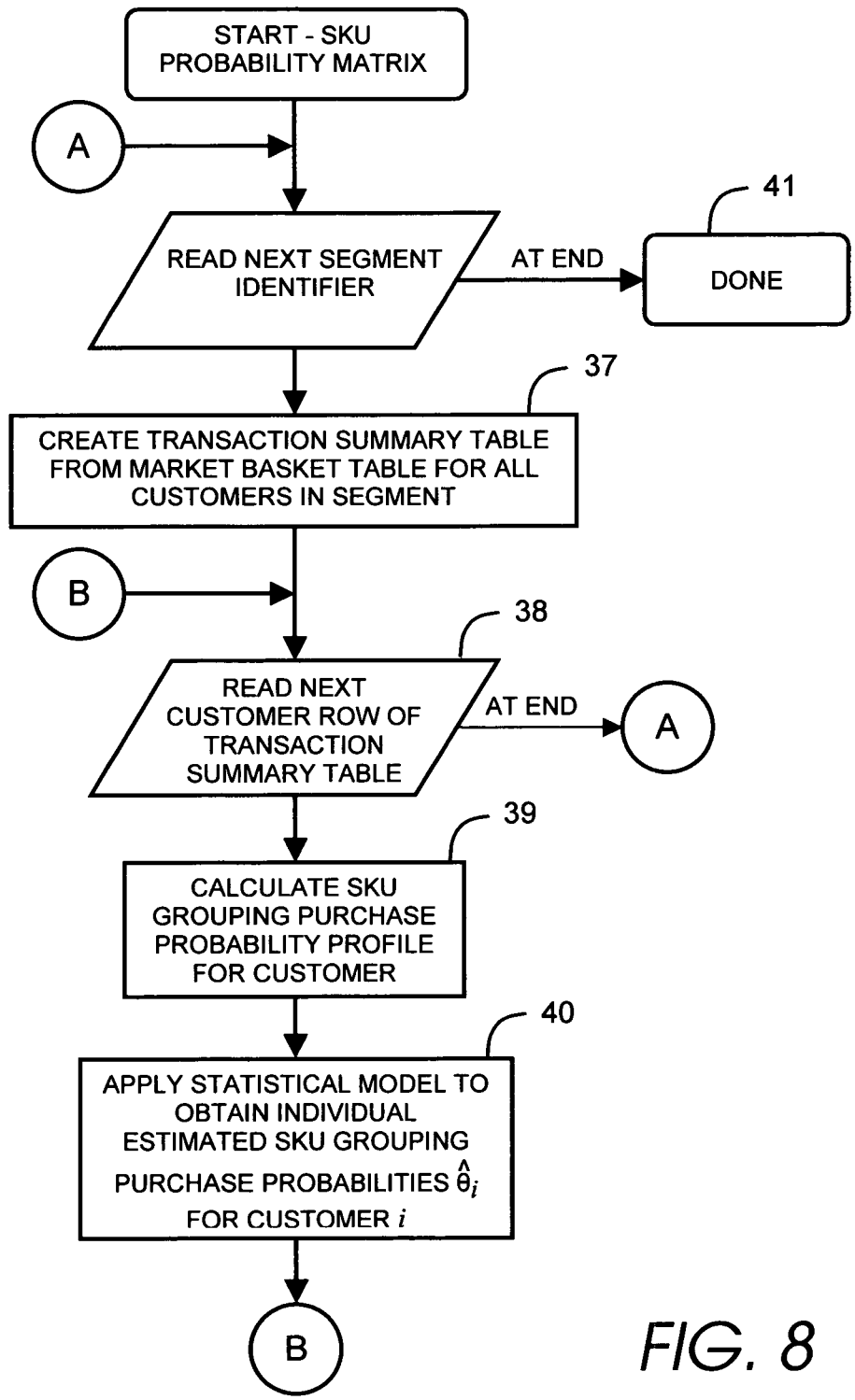
FIG. 8 an illustrative flowchart for computing the SKU Probability Matrix
Figure 9:
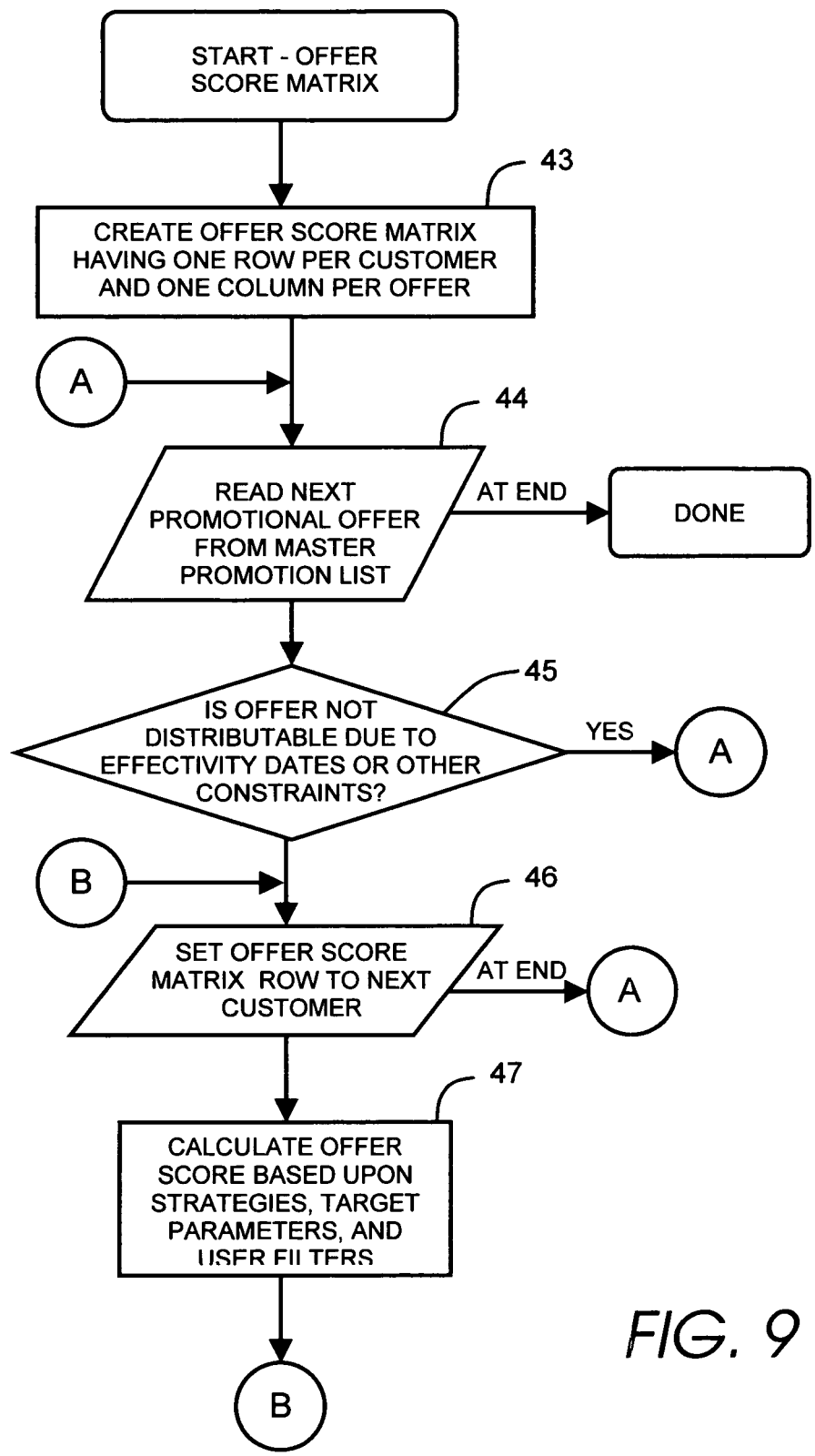
FIG. 9 an illustrative flowchart for the calculation of the Offer Score Matrix based upon the probability matrix exemplified by FIG. 3.

A description is now given of various computations and probability estimates with reference to FIGS. 7-9 showing flowcharts of an embodiment of the invention. Routine details such as initialization operations and testing order for loop initialization as well as other routine implementation matters are well within the ordinary skill and understanding of practitioners in the art and thus need not be disclosed in any detail here.

FIG. 7 is a flowchart illustrating an embodiment of a method for calculating the average SKU Group probabilities given any form of customer marketing segmenting. The operational definition of Market Segmenting as used herein is the classification of customers into mutually exclusive groups having similar marketing characteristics according to predefined intentions, inclusion rules, methods, or algorithms. Although the example described here refers to a specific form of Market Segmenting, the invention is not intended to be limited to any particular form of segmenting. Segmenting can be based upon any of the several well known clustering algorithms such as K-means Clustering, Expectation Maximization, Kohonen's Self-Organizing Maps, or upon any other basis that appears subjectively appropriate. The objective of the present embodiment is to calculate the probability that at least one SKU of a specified SKU Grouping will appear in the next market basket of a given customer of the given Market Segment as represented by a predictive model. The collection of such probabilities for a given customer is referred to here as the customer's probability profile, and the collection of all such probabilities for all customers of a given market segment is the segment probability profile. The objective of the flowchart of FIG. 7 is to calculate a probability profile model (priors) for each segment, independent of other segments, based upon the purchase history data for the members of that segment or a subset thereof. The model is used to predict the probability profile of an individual customer in the segment given the individual's purchase history for the previous m baskets, where m is a parameter that may be set to accommodate such system considerations as computational time and memory capacity. The flowchart begins at reference numeral 31 by partitioning all customers into Marketing Segments. Each customer is marked to identify the appropriate Market Segment. As indicated above, a number of schemes are known for market segmentation, the details of which need not be described here. The invention is intended to operate with any appropriate Market Segmenting method. A Transaction Summary Table such as illustrated in the simple example of FIG. 6A is then generated for each Market Segment. A Market Segment identifier is read, and the Transaction Summary Table is generated for that Market Segment at reference numeral 32 from the data in the Market Basket Transaction Database for all customers of the given Market Segment. The resulting Segment Transaction Summary Table is then stepped through, customer by customer, and aggregate statistics are compiled progressively as each customer's contribution is combined with the aggregate statistics for the preceding customers already considered at reference numeral 33. That is, the aggregate statistics at each stage are updated with the next customer's data until all the customers of the segment have been considered. For extremely large segments it may be desirable determine the aggregate statistics of the model based on a sample of customers from the segment instead of considering all customers of the segment. Finally, the aggregates are used at reference numeral 34 to compute the probability profile model for the entire segment. When the computation for the segment is complete, the flowchart cycles at B to read the next segment identifier and to continue. When the probability profiles have been determined for all segments, the flowchart ends at reference numeral 35.

FIG. 8 is a flowchart illustrating a computation of the SKU Probability Matrix for the Market Segments, which contains the estimated predicted probability of each SKU appearing in the market basket of each customer and from which an offer probability matrix exemplified by FIG. 3 may be generated. In a later computational step, described in connection with FIG. 10, entries in an offer probability matrix are embellished and referred to more generally as Score, rather than "probability." The flowchart of FIG. 8 begins much as that of FIG. 7. A Market Segment identifier is read, and the Transaction Summary Table is generated for that Market Segment at reference numeral 37 from the data in the Market Basket Transaction Database for all customers of the given Market Segment or a previously compiled Transaction Summary Table may be referenced. The resulting Segment Transaction Summary Table is then stepped through, customer by customer, at reference numeral 38 and the SKU Grouping purchase probability profile is calculated for each customer at reference numeral 39. A purchase profile model is then applied to each row of this table at reference numeral 40.

In the simplest model the estimated probability for SKUj of customer X could be calculated as the numerical average of the number of shopping baskets in which one or more SKUj appear, divided by the total number of X's baskets. This calculation ignores the shopping behavior of the aggregate segment population. Using the example data of FIGS. 6A and 6B, the frequency of SKU 36 is 3 and the estimated probability is simply (3 occurrences)/(4 baskets)=¾.

The calculation of the probability estimates for SKUj for customer X may advantageously use a parametric empirical Bayes model. In such cases the calculation takes into account the statistics calculated over the entire population of customers within the Market Segment as well as those computed only for the individual customer. The various forms and means of parameter estimation for empirical Bayes models are generally well known and need not be described in any detail here. See, for example, *An Introduction to Mathematical Statistics and its Applications* by Richard J. Larsen and Morris L. Marx, Published by Prentice Hall. See also references cited therein for empirical Bayes and other estimator techniques. Different embodiments of the invention may use several different methods for different situations. Moreover, in some applications it may sometimes be advantageous not to use an empirical Bayes estimator at all, but rather to use another (non-empirical Bayesian) method.

An example is given here calculating one such empirical Bayes model and making predictions with it. The number of baskets $x_i$ out of $n_i$ for customer i that contain a given SKU (or any of a group of SKUs) is modeled by a binomial distribution $Bin(n, \theta)$ whose $\theta$ parameter is in turn drawn from a $^{Beta}(\mu, M)$ distribution. This model comes from a class of so-called conjugate models that are preferred because they are particularly amenable to computation. The probability that the SKU (or any in a group of SKUs) will be in the next basket of customer i is simply $\theta_1$. The empirical Bayes estimate $\hat{\theta}_i$ of the probability $\theta_i$, for customer i is given in terms of the estimates for the mean of the prior $\hat{\mu}$, and from it $\hat{M}$ determined for the population in aggregate:

$$\hat{\theta}_i = \frac{\hat{M}\hat{\mu} + x_i}{\hat{M} + n_i} \text{ where } \hat{M} = \frac{\hat{\mu}(1-\hat{\mu}) - s^2}{s^2 - \hat{\mu}(1-\hat{\mu})/n}$$

and the estimates for the mean $\hat{\mu}$ and variance $S^2$ are computed for the N customers in the segment using:

$$\mu^2 = \sum_{i=1}^{N} x_i / n_i$$

$$s^2 = \frac{1}{N} \sum_{i=1}^{N} (x_i / n_i - \hat{\mu})^2$$

The flowchart cycles through all the customers of the segment at B and then through all segments at A. When the probability profiles have been determined for all segments, the flowchart ends at reference numeral 41.

FIG. 9 is a flowchart illustrating the calculation of the Offer Score Matrix. The objective of the flowchart is to provide a measure of the estimated probability that a given customer will purchase the Promotion SKU of each offer, when the various strategies, rules, multipliers, and all other factors are taken into consideration. No immutable rule applies to estimating the probability that an offer j will be accepted by a customer i. The rules and functional relationships are based upon probabilities and functional estimators of probabilities, but they are formed heuristically as predictors of the actions of the customer. Consequently the elements of the offer matrix are referred to as scores rather than probabilities, and the matrix is referred to as the Offer Score Matrix. An Offer Score Matrix structure is generated at reference numeral 43 having one row per customer and one column per offer. The matrix is populated at reference numeral 44 by sequencing through each offer of the Master List of Offers 12 illustrated in FIG. 1. When this is completed, the populated Offer Score Matrix then corresponds to the matrix exemplified in FIG. 3, at which point the Ordered Offer List 13 of each customer, as exemplified by FIG. 1, can be constructed. There are several circumstances that can prevent further distribution of a given offer. For example, the offer may have expired, the store location might be excluded, or the limit of any and all distributions may have been exceeded. The presence of these offer-excluding circumstances is checked at reference numeral 45 and if present, the offer is skipped and the next one is considered. The flowchart terminates when no other offer is available to consider. If the offer exists and is not skipped, it is given a score for each individual customer at reference numeral 46. The offer score is determined at reference numeral 47 by strategies and other factors that target the customers and that adjust the relative importance of one offer as compared to others for each customer.

Figure 10:
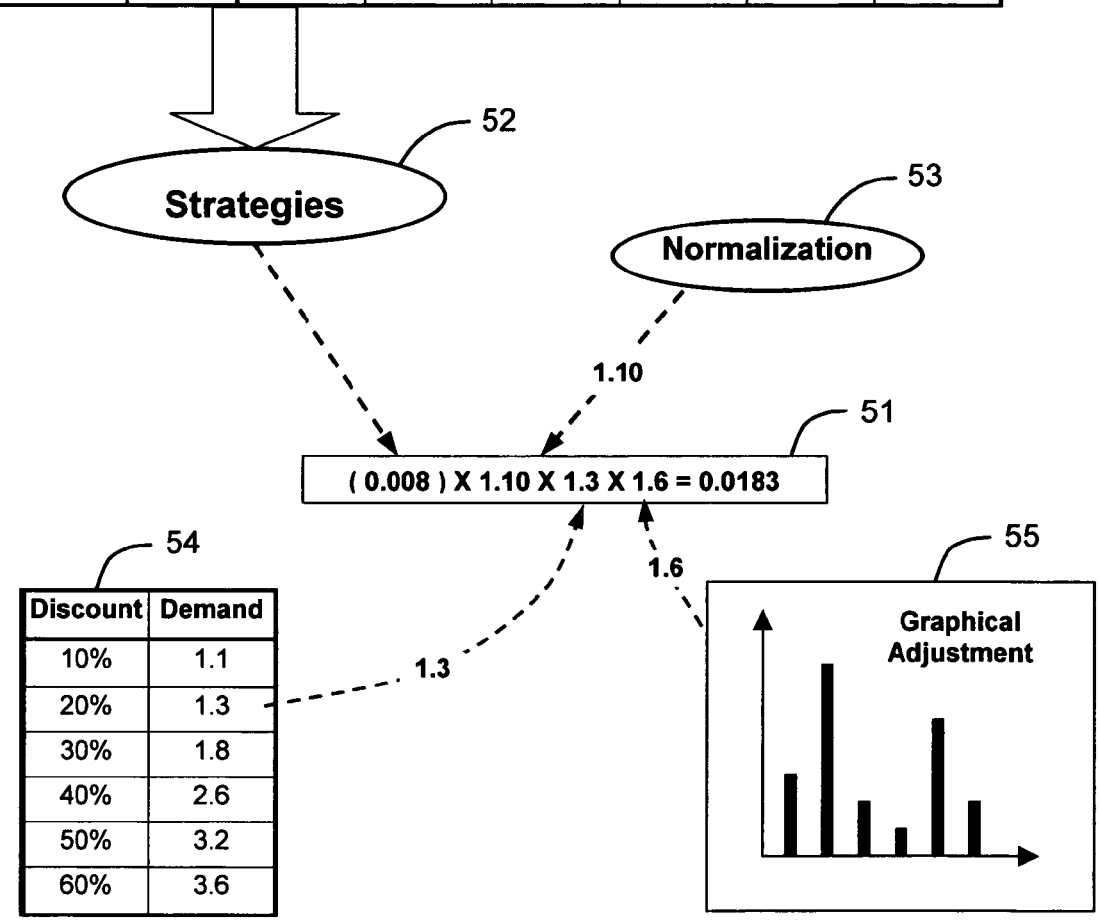
FIG. 10 is a flow diagram illustrating several ways in which the user can define how the offer scores are to be calculated.

FIG. 10 illustrates several ways in which the user can define how the offer scores are to be calculated in FIG. 9. A sample calculation is shown at reference numeral 51. In one embodiment the user expresses scoring intentions through Strategies 52. These are preprogrammed targeting criteria stated in terms of SKU Groupings, which are either implied by the offer or declared explicitly by the user. Initially the user provides a taxonomy of all SKUs divided into departments, categories, subcategories, etc. The user can then refer to any level, or levels, of the taxonomy in order to target customers by SKU probabilities. The preprogrammed strategies reference the taxonomy in an abstract way so that one strategy may apply to any offer. For example, the probability produced by the strategy may be equal to the probability that the customer will purchase any of the SKUs referenced, implied, or explicitly declared, by the strategy. For example the MoveStock strategy applied to an offer for SKU X implicitly declares the score for the customer to be the probability that the customer will purchase any of the SKUs in the subcategory containing SKU X. In the case of Corn Flakes, the score from the existing taxonomy of a very large supermarket chain would be the probability that the customer will purchase any SKU in the subcategory called "Cold Cereal," which is in the category called "Cereal & Breakfast Foods." Other functional relationships between SKU probabilities and offer probabilities can be used in addition to or instead of the combined probabilities of the taxonomical groups referenced by the strategy. In the Corn Flakes example, the MoveStock strategy produces the purchase probabilities of the various brands of cereals such as Wheaties, Bran Flakes, Cheerios and so on through all cereal in the "Cold Cereal" subcategory. The purchase probability values of each SKU are not of themselves sufficient for the calculation of combined probabilities. The information illustrated by FIG. 5 is needed to calculate the combined probability of purchasing any of several SKUs. The probability is based upon the percentage of market baskets in which any combination of referenced SKUs appears. For example, the Strategy 52 might produce the SKU Grouping probability of 0.008. In general, Strategies refer to two kinds of SKU, the one or more being promoted, and the one or more used for targeting. The first kind, designated the Promoted SKU, is always provided by the offer. The second kind, designated the Targeting SKU, is usually an aggregate of SKUs derived from the SKU taxonomy and declared in different ways for each Strategy. The objective of the Strategy is to equate, for each customer, the probability of purchasing the Promoted SKU to the probability of having purchased the Targeting SKU.

The Strategies are parameterized to support explicit taxonomical references where the Targeting SKU is not implicit. Some strategies require other parameters. For example, the UpSell Strategy requires a set of starting SKUs to "sell up" from. A software utility can reduce that set by eliminating any SKU for which the price is equal or greater than that of the Promoted SKU. Customers having a high purchase probability for those SKUs would be motivated by the promotional offer to try the more expensive SKU of the offer. The Targeting SKU is a user declared parameter. In general, the Strategy is defined by defining the Targeting SKU, since the Promoted SKU is always defined in the offer. For example, in the Cross-Sell Strategy attempts to induce customers who purchase the Targeting SKU to also purchase the Promoted SKU. An instance would be a 50% discount on caviar for customers with a proclivity for Vodka. The Targeting SKU is a user-declared parameter. The Introduction Strategy is an attempt to induce purchasers of a very wide range of Targeting SKUs to try the Promotion SKU. The Targeting SKU is implicitly taken to be the category one level above the subcategory to which the Promotion SKU belongs. Using Introduction rather than MoveStock as the Strategy for that example, the Targeting SKU would be all SKUs in the broader "Cereal & Breakfast Foods" category, rather than the "Cold Cereal" subcategory contained within it. The purpose of the Reward Strategy is to reward the best customers by simply offering something they like at a meaningful discount. For example, a customer's favorite wine might be offered once at 50% discount. In the case of the Reward Strategy, the Targeting SKU is taken to be the Promoted SKU. The BrandChange Strategy attempts to entice the customer from a currently used brand to the promoted brand. The Targeting SKU is formed from the subcategory of the Promoted SKU by eliminating any SKU of the Promoted Brand before estimating purchase probabilities. Thus a customer is more likely to be offered the promotion if that customer is a more frequent user of a competing brand. Finally, the Custom Strategy admits any collection of taxonomical references from SKU to subcategory to category, etc. through the entire taxonomy. The purpose is to permit any arbitrary targeting considered meaningful to the user. From time to time, non-custom Strategies can be added as they are proven to be useful for the specific application of the invention.

In one aspect of the invention the SKU Grouping probabilities are normalized, indicated at reference numeral 53, in such a way that that the offer scores are not dominated by inexpensive SKU Groupings that appear regularly in most of the market baskets, for example milk and bread. The objective of normalization is to take into account the purchasing probabilities of each customer as compared to those of all customers. One more easily calculated method of normalization is based upon rough estimates of SKU probabilities, rather than detailed calculations of SKU Groupings. For example, for each customer a ratio is formed by dividing the sum of the SKU probabilities of every SKU in each given SKU Grouping by the average purchase probability of the same set of SKUs for the entire population of customers in the same segment. That ratio then provides a rough indication of how different the purchasing probabilities for the given customer are as compared to the whole. In the example calculation at reference numeral 51, the normalizing ratio of 1.10 suggests that the customer is more probable than the average to accept the offer. Other normalization adjustments are possible. Imposing no normalization is equivalent to a normalization ratio of unity.

In another of its aspects the invention provides for a Discount/Demand table 54, which equates discount percentage to a coefficient appearing in the score calculation. The discount or other incentive is a parameter of each offer that can be expected to affect the probability of accepting the offer. The coefficient can multiply the score automatically, from the table, or manually through a user interface. For example, a discount of 20% may increase the probability by 1.3 as in the example of the figure, and by 2.6 in the case of a 40% discount. Such tables are prior art in businesses, retail or otherwise, and depend upon various aspects of the particular business. Although the user of this invention must provide the appropriate table, the use of the table for probability calculations is an element of this invention that avoids the disadvantage of failing to distribute offers of relatively unpopular SKU at a vast and seductive discount. For example, a wine normally sold at $42 per bottle may not have a high demand. However, were the wine to be discounted by 50 percent and sold at $21, the demand might be extremely high.

Another aspect of the invention provides a visual/graphical method for revising the distribution of promotional offers and is indicated at reference numeral 55 in FIG. 10. It is a revision method for manually overriding the distribution of promotional offers after the distribution list for all offers and all customers is assembled. In cases where the targeting computations and methods of the invention lead to final distributions that are unexpected and in some ways undesired by the user, the user is able to view a display such as a bar chart of the distribution of offers and modify the distribution appropriately. The identifier and/or name of each promotional offer of the Master List appears on the horizontal axis of the bar chart display 55. The height of each bar shows the number of the given offers distributed. The user can click on any bar, and drag it to a greater or smaller distribution. An adjusted coefficient appears in the score of the offer for all customers and the new total is calculated. The total distribution is estimated quickly by sampling methods so that the bar chart changes within an acceptable delay. FIG. 10 illustrates how the user's bar chart adjustments set the value of an offer score coefficient, 1.6 in the Figure, thereby changing the offer score of the given offer for each customer.

Figure 1:
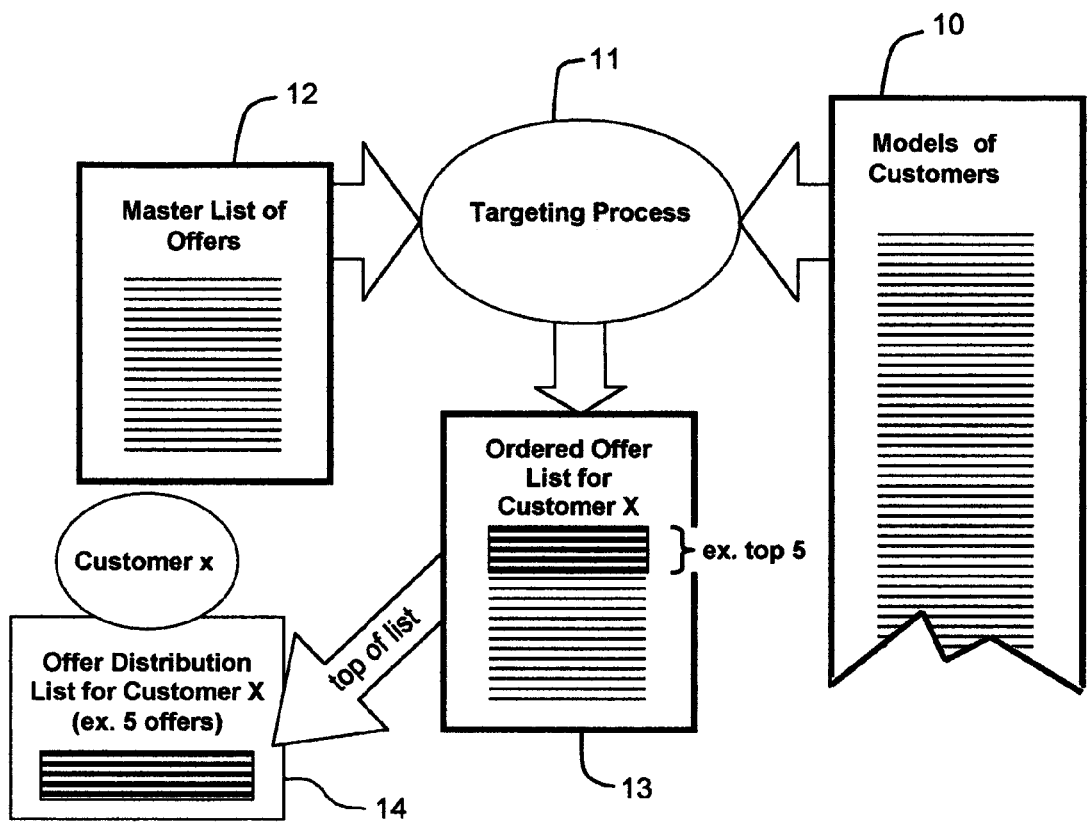
FIG. 1 is a block diagram overview of the methods of the invention
Figure 11:
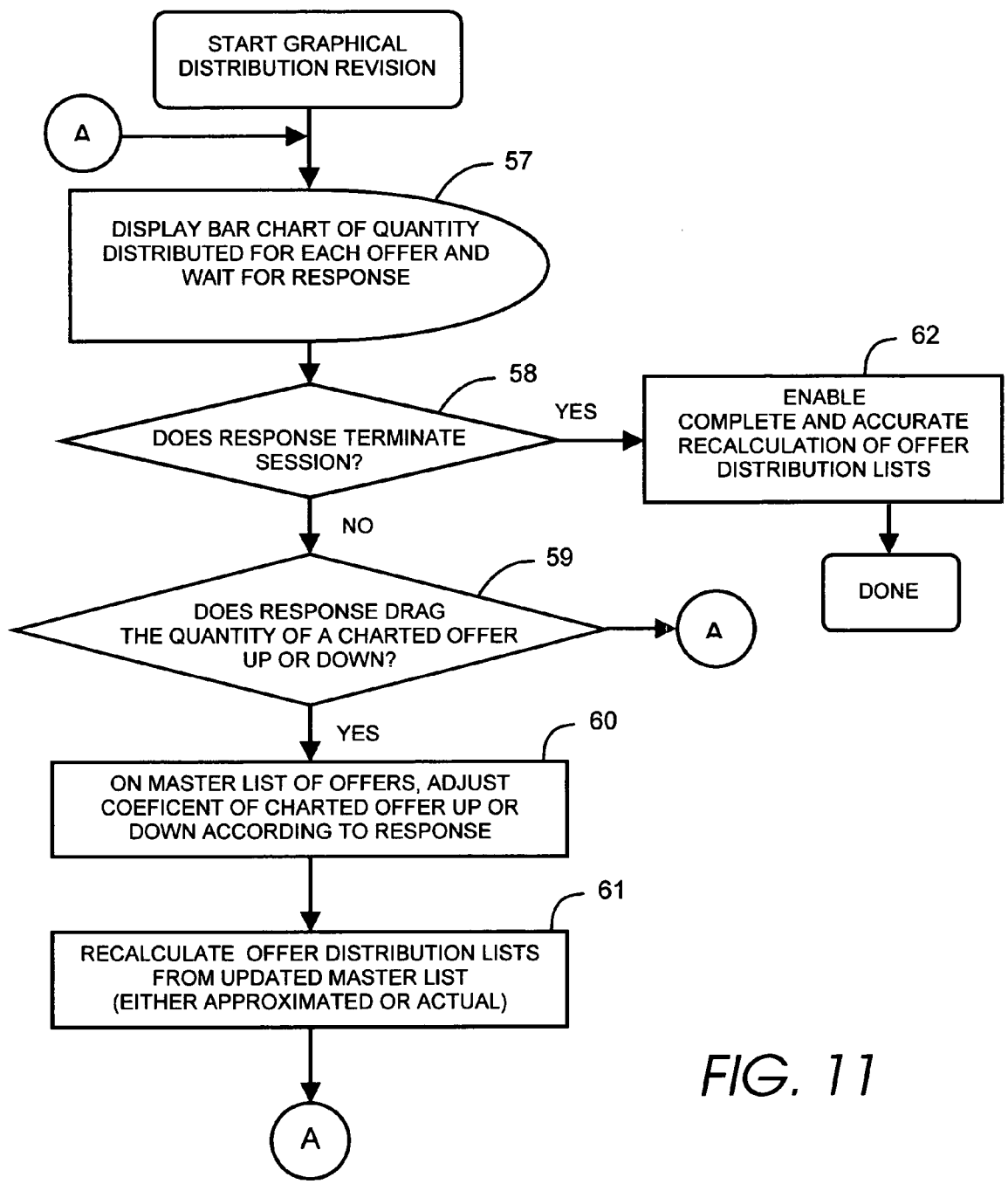
FIG. 11 an illustrative flowchart for effecting readjustment in offer probabilities.

FIG. 11 illustrates a method for effecting manually overriding adjustments to the offer distribution. At reference numeral 57 a bar chart such as that at reference numeral 55 of FIG. 10 is displayed by request of the user. The user then has a choice at reference numeral 58 of either terminating the session or adjusting an offer probability/score. At reference numeral 59 the user adjusts the height of a bar by click-dragging it to a new value. Several ways of updating the distribution are possible. In one embodiment indicated at reference numeral 60, the Master List of Offers 12 FIG. 1 is updated to reflect the new adjustment coefficient. The complete distribution is then calculated again, and all Offer Distribution Lists 14 are updated at reference numeral 61. The recalculation need not be done accurately for this adjustment. It can be done rapidly by sampling and estimating so that the updated bar chart can be viewed by the user without unacceptable delay. After any number of adjustments, the user can then declare the session terminated and, in so doing, enable a complete and accurate recalculation of distribution lists at reference numeral 62.

Figures 12, 13:
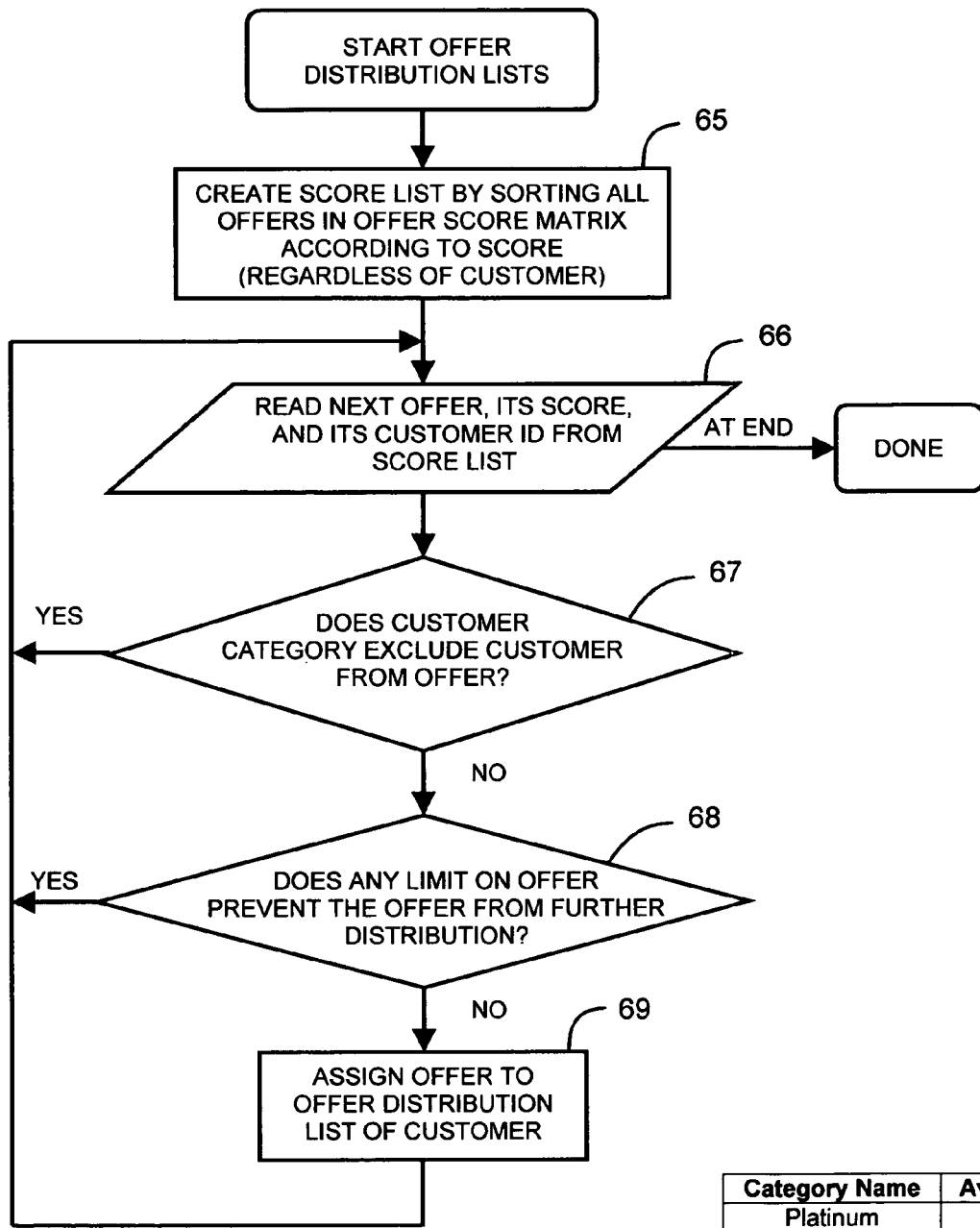
FIG. 12 an illustrative flowchart for the final calculation of the Offer Distribution Lists, including the Limit Manager.
FIG. 13 illustrates an example of a loyalty program categorization table.

FIG. 12 illustrates the final calculation of the Offer Distribution Lists. The calculation begins after construction of the Offer Score Matrix illustrated in FIG. 9 and all scoring operations are complete, as illustrated in FIG. 10. A score list is constructed at reference numeral 65 by sorting all offers according to their scores. Each entry in the list is a triple of score, offer, and customer to which each offer score belongs, although only the score determines the sort order. The offers of the list are distributed list-entry-by-list-entry at reference numeral 66 until all entries have been distributed or discarded. The offer is not distributed to the associated customer if prevented by the customer's category at reference numeral 67. The customer category may have no relationship to the Market Segment referenced in FIG. 7 but is usually associated with some recognizable marketing attribute of the customer. Membership in a category is based upon some recognition rule provided by the user. For example, the user may intend to withhold distribution of an offer for an alcoholic beverage from customers of the category, "under 18 years of age." A commonly used categorization is by customer spending. The loyalty table of FIG. 13 is an example. Customers of the Platinum category spend $120 per month or more, Gold between $60 and $120, and so forth. The user might choose to distribute an offer only to Platinum customers, as a reward for loyalty. Another offer might be extended to both Gold and Platinum customers, etc. Should an offer of very high order on the score list be withheld from a customer because of categorization, it may appear lower on the list for some other customer of a category that does permit distribution of the offer. The offer may be withheld from any or all customers for an entirely different constraint—that of distribution limits that may be imposed at reference numeral 68. Several limits are in common use, for example, limits on the number of offers distributed in total, the number for each offer communicator terminal, the number for each store, the number for each offer, and also the maximum to be delivered to any one customer. Each limit is tallied separately. When any of the limits is exceeded, the offer is not distributed to the customer. Otherwise the offer is placed on the Offer Distribution List of the customer at reference numeral 69. The setting of limits in the past had the major disadvantage of distorting the targeting process. Some offers that were less likely to be redeemed by the customer might have been distributed while some that were more likely to be redeemed might not. This process, referred to as the Limit Manager, avoids that major disadvantage in the normal operating situations.

Referring once again to FIG. 2, at reference numeral 71 the Offer Distribution Lists 14 of FIG. 1 are then passed to channel adapters indicated generally at reference numeral 72 where they are matched with the promotional offer content and conveyed by any printed or electronic means to the customers such as those means indicated at reference numeral 73.

The above descriptions and drawings are given to illustrate and provide examples of various aspects of the invention in various embodiments. It is not intended to limit the invention only to these examples and illustrations. Given the benefit of the above disclosure, those skilled in the art may be able to devise various modifications and alternate constructions that although differing from the examples disclosed herein nevertheless enjoy the benefits of the invention and fall within the scope of the invention, which is to be defined by the following claims.

What is claimed is:

1. In an electronic system for distributing promotional offers, a method of targeting a plurality of customers from a customer database for distribution of limited quantities of promotional offers, the method comprising:
   generating a plurality of scores for said plurality of customers, each said score being associated with one said customer and with one said offer, and each said score measuring a probability that the associated customer will make a purchase in accordance with the associated offer;
   identifying, by a computing device in said electronic system, a highest score in said plurality of scores;
   determining:
      a customer, from said plurality of customers, associated with said highest score, and
      a first promotional offer, from said plurality of promotional offers, associated with said highest score;
   assigning said first promotional offer to a first personalized offer list for said customer if said first promotional offer satisfies one or more constraints on one or more of the following:
      a total number of first promotional offers that are distributable, and
      a total number of promotional offers that are distributable to said customer;
   successively repeating said identifying, determining and assigning steps for each next highest score until all of the promotional offers in said plurality of promotional offers have been assigned to personalized offer lists; and
   distributing one or more of the promotional offers to one or more of the customers in said plurality of customers.

2. The method of claim 1, wherein said promotional offers relate to a plurality of products organized in taxonomic product groupings, and the method further comprises:
   providing a product grouping probability profile associating with each said product grouping a measure of the probability that a customer will purchase a product from said product grouping; and
   deriving said score for each said combination of customer and promotional offer from the measure of probability associated with each product grouping containing a product subject to the promotional offer.

3. The method of claim 1, wherein said promotional offers relate to a plurality of products organized in taxonomic groupings, and the method further comprises:
   basing the scores associated with one or more of said offers on the grouping probability that a customer will purchase any product in a given taxonomic grouping.

4. The method of claim 3 wherein a score is based on said grouping probability and the offer associated with said score is for a product included in said given taxonomic grouping.

5. The method of claim 3 wherein a score is based on said grouping probability and the offer associated with said score is for a product not included in said given taxonomic grouping.

6. The method of claim 1 wherein said one or more constraints include a limit on the number of offers delivered to any individual customer and said method further comprises:
   performing said assigning step for each said identified customer only a number of times equal to said limit.

7. The method of claim 2, further comprising:
   providing access to a transaction history database for at least a substantial portion of said plurality of customers, wherein the database associates with each customer of said substantial portion an identification of transactions engaged in by the customer and an identification of products previously purchased by the customer in each of the transactions;
   providing a transaction summary data structure associating with each said customer the total number of transactions the customer has engaged in and the numbers of transactions including each said product grouping;
   averaging the product groupings per transaction from said transaction summary data structure for at least a portion of said customers; and
   deriving said measure of probability associated with each said product grouping from the averaged product groupings per transaction for the associated product grouping.

8. The method of claim 2, further comprising:
   normalizing said product grouping probability profile for an individual customer to reflect a relative probability of said individual customer purchasing from a product grouping with respect to an average probability for a customer to purchase from said product grouping.

9. The method of claim 2, further comprising:
   applying preprogrammed targeting criteria embodying a marketing strategy to said product grouping probability profile to provide a profile of offer scores.

10. The method of claim 9, wherein
    said marketing strategy includes at least one targeting product grouping and a promoted product grouping linked to said at least one targeting product grouping; and
    said promotional offers are distributed only to customers having a high probability of acceptance from said at least one targeting product grouping.

11. The method of claim 10, further comprising:
    providing a taxonomy of said product groupings;
    wherein said at least one targeting product grouping is defined in reference to said taxonomy.

12. The method of claim 10, wherein said marketing strategy includes a MoveStock strategy.

13. The method of claim 10, wherein said marketing strategy includes an UpSell strategy.

14. The method of claim 10, wherein said marketing strategy includes a CrossSell strategy.

15. The method of claim 10, wherein said marketing strategy includes a Reward strategy.

16. The method of claim 10, wherein said marketing strategy includes a BrandChange strategy.

17. In an electronic system for distributing promotional offers, a method of adjusting the distribution of limited quantities of promotional offers from a plurality of promotional offers to a plurality of customers comprising:

providing a plurality of measures of acceptance probabilities, wherein the plurality of measures of acceptance probabilities includes, for each combination of a customer of the plurality of customers and a promotional offer of the plurality of promotional offers, a measure of an acceptance probability that the customer will accept the promotional offer, said acceptance probability being indicative of a likelihood said customer will accept the promotional offer in comparison to other customers included in said plurality of customers;

presenting the plurality of measures of acceptance probabilities for an individual customer in a graphical display on said electronic system, wherein said graphical display includes a plurality of graphic elements, one said graphic element being associated with each said measure of acceptance probability provided for said individual customer at least for a highest ranking measure of acceptance probability of said plurality of measures of acceptance probabilities;

enabling adjustment of said measures of acceptance probability for the individual customer by movement of the associated graphic elements;

selecting, by a computing device in said electronic system, a limited quantity of offers from said plurality of offers for distribution to said individual customer, wherein said limited quantity of offers are selected substantially in descending order of said measures of acceptance probabilities for the individual customer as adjusted in said enabling step; and distributing at least one of the limited quantity of offers to said individual customer.

18. The method of claim 17, wherein said graphical display comprises a bar chart, said graphic elements comprise individual bars of said bar chart, and said movement comprises dragging said bars to lengthen and shorten them and thereby increase and decrease the associated measures of acceptance probability for the individual customer.

19. In an electronic system for distributing promotional offers, a method of distributing limited quantities of promotional offers to a plurality of customers utilizing a transaction history database comprising an identification of transactions engaged in and an identification of products previously purchased by one or more customers, said method comprising:

deriving a historical purchase probability profile from said transaction history database for at least a portion of the customers in said database and for a plurality of product groupings in said database, said historical purchase probability profile providing for each individual customer and for each individual product grouping a measure of the probability that said individual customer will purchase a product from said individual product grouping;

for a customer included in said portion of the customers, applying a statistical model to said purchase probability profile to determine an estimated probability that said customer will purchase a product from said product groupings, said estimated probability being indicative of a likelihood said customer will purchase said product in comparison to all other customers included in said portion of customers;

selecting, by a computing device in said electronic system, for distribution to said customer an offer associated with a product in said product groupings, wherein said selected offer is associated with a highest estimated probability that said customer will purchase said product in comparison to all other customers included in said portion of customers, determining whether said selected offer satisfies one or more constraints, wherein one of the one or more constraints is a limitation on a total quantity of promotional offers for said product that are distributable to all customers; and in response to said selected offer satisfying the one or more constraints, distributing the selected offer to said customer.

20. The method of claim 19 wherein said statistical model is an empirical Bayesian statistical model.

21. The method of claim 19 wherein one or more of said product groupings includes one and only one product.

* * * * *